US010770848B2

(12) United States Patent
Mastrovito

(10) Patent No.: US 10,770,848 B2
(45) Date of Patent: Sep. 8, 2020

(54) CONNECTING ELEMENT

(71) Applicant: STAUBLI ELECTRICAL CONNECTORS AG, Allschwil (CH)

(72) Inventor: Andrea Mastrovito, Münchenstein (CH)

(73) Assignee: STAUBLI ELECTRICAL CONNECTORS AG, Allschwil (CH)

( * ) Notice: Subject to any disclaimer, the term of this patent is extended or adjusted under 35 U.S.C. 154(b) by 0 days.

(21) Appl. No.: 16/318,407

(22) PCT Filed: Jul. 6, 2017

(86) PCT No.: PCT/EP2017/066934
§ 371 (c)(1),
(2) Date: Jan. 17, 2019

(87) PCT Pub. No.: WO2018/015170
PCT Pub. Date: Jan. 25, 2018

(65) Prior Publication Data

US 2019/0288467 A1 Sep. 19, 2019

(30) Foreign Application Priority Data

Jul. 18, 2016 (EP) .................................... 16179977

(51) Int. Cl.
*H01R 25/16* (2006.01)
*H01R 4/48* (2006.01)
(Continued)

(52) U.S. Cl.
CPC ......... *H01R 25/162* (2013.01); *H01R 4/4881* (2013.01); *H01R 13/113* (2013.01); *H01R 13/187* (2013.01); *H01R 2201/26* (2013.01)

(58) Field of Classification Search
CPC .. H01R 25/162; H01R 4/4884; H01R 13/113; H01R 13/187
(Continued)

(56) References Cited

U.S. PATENT DOCUMENTS 4,462,657 A * 7/1984 Snowdon ............. H01R 13/187 439/724
4,627,680 A * 12/1986 Weimer ................. H02G 5/007 174/88 B
(Continued)

FOREIGN PATENT DOCUMENTS

CH 702 863 A1 9/2011
EP 0 520 950 A1 12/1992
(Continued)

OTHER PUBLICATIONS

International Search Report for PCT/EP2017/066934 dated Aug. 23, 2017 (PCT/ISA/210).

*Primary Examiner* — Alexander Gilman
(74) *Attorney, Agent, or Firm* — Sughrue Mion, PLLC

(57) ABSTRACT

A connecting element (1) serves to establish electrical contact between two busbars. The connecting element (1) comprises a housing (2) with an interior (20) and a contact element (3) which is mounted in the interior (20). The contact element (3) comprises at least one resilient contact web (32) and defines a substantially flat plane (39). The contact element (3) divides the interior (20) along the plane (39) into at least a first receiving space (21) for receiving a first busbar (4) and a second receiving space (22) for receiving a second busbar (5), wherein the contact element (3) establishes electrical contact between the first busbar (4) and the second busbar (5) by way of the at least one contact web (32).

49 Claims, 9 Drawing Sheets

(51) Int. Cl.
*H01R 13/11* (2006.01)
*H01R 13/187* (2006.01)

(58) Field of Classification Search
USPC .......................................................... 439/121
See application file for complete search history.

(56) References Cited

U.S. PATENT DOCUMENTS 4,679,872 A * 7/1987 Coe .......................... H05K 1/14 439/61
4,886,940 A * 12/1989 Gagnon ............... H01R 25/162 174/88 B
5,261,830 A * 11/1993 Jego ....................... H02G 5/007 439/210
5,261,840 A 11/1993 Benz
5,442,135 A * 8/1995 Faulkner ................ H02G 5/007 174/68.2
5,466,889 A * 11/1995 Faulkner ................ H02G 5/007 174/133 B
5,486,651 A * 1/1996 Morgan ................. H02G 5/007 174/129 B
5,619,014 A * 4/1997 Faulkner ................ H02G 5/007 174/129 B
6,336,828 B1 * 1/2002 Huerta .................... G06F 1/189 361/727
6,435,888 B1 * 8/2002 Reed, Jr. .................. H01R 4/30 174/88 B
6,642,457 B2 * 11/2003 Rees ........................ H02G 5/00 174/149 B
6,677,532 B2 * 1/2004 White .................... H02G 5/061 174/99 B
7,678,995 B2 * 3/2010 Hengel ................ H01R 4/4881 174/88 B
7,819,681 B1 * 10/2010 Rodrigues ............. H02G 5/007 174/88 B
8,033,850 B2 * 10/2011 O'Leary ................ H02G 5/007 174/16.2
8,500,475 B2 * 8/2013 Takehara ............... H01R 4/305 174/88 B
2016/0226181 A1 8/2016 Sturgess et al.

FOREIGN PATENT DOCUMENTS

JP 2013-008629 A 1/2013
WO 2014/146905 A1 9/2014

* cited by examiner

CONNECTING ELEMENT

This application is a National Stage of International Application No. PCT/EP2017/066934 filed Jul. 6, 2017, claiming priority based on European Patent Application No. 16179977.0 filed Jul. 18, 2016.

TECHNICAL FIELD

The invention relates to a connection element for receiving a contact element to establish an electrical contact between two busbars as claimed in claim 1.

PRIOR ART

Connection elements for the electrical connecting of two conductor elements such as two parallel running busbars are known from the prior art.

Many such contact elements are likewise known from the prior art. For example, one can mention here the corresponding products of the applicant.

Busbars are used for example in vehicles as fixed electrical conductor elements, which should then be electrically connected to busbars of other elements, such as an inverter module. Busbars may be used both in passenger cars, trucks, public transit vehicles, or electric bikes. With the use of hybrid motors, which are driven by fossil fuels and electric current, busbars are being used increasingly in passenger cars. Such busbars have also been used increasingly as contacts in connection with the propulsion of electric bikes.

Many connection solutions are known from the prior art for the connecting of busbars. For example, busbars are connected with the aid of screw fasteners, which must provide large pressing forces, since the contact points are only inadequately defined by a surface contacting. For this reason, it has become common to arrange a contact blade between the two busbars, which improves the electrical contact.

However, the prior art has the drawback that the connection by means of screws between the two busbars and the contact blade is very costly, which is undesirable in particular in the automotive industry, where short cycle times are required during manufacturing.

PRESENTATION OF THE INVENTION

Starting from the prior art, the problem which the invention proposes to solve is to indicate a connection element for the connecting of two busbars that overcomes the drawbacks of the prior art. Moreover, another preferred problem of the present invention is to indicate a connection element which can be produced easily and economically.

This problem is solved by the connection element of claim 1. Accordingly, a connection element for establishing an electrical contact between two busbars comprises a housing with an interior and a contact element, which is mounted in the interior. Each of the two busbars can be inserted into the housing along an inserting direction. The contact element divides the interior along the plane into at least one first receiving space to receive a first busbar and a second receiving space to receive a second busbar. The contact element establishes an electrical contact between the first busbar and the second busbar. The contact element is mounted by several bearing points in the interior of the housing. At least one of the bearing points protrudes from a side wall into the interior, the side wall lying in a transverse plane oriented transversely to the plane, and the bearing point for the contact element providing a movement limitation in at least one translatory direction.

Such an arrangement of the bearing point yields the advantage that the other walls of the housing remain largely nonweakened, because no bearing points protrude from them. Furthermore, it produces the advantage that the two receiving spaces are blocked with the fewest possible bearing points, which might interfere with the inserting process of the busbars. Moreover, it produces the advantage that the stamping process becomes easier, which makes the manufacture more cost-favorable.

Thanks to the partitioning of the interior with the contact element, a structure can be created in which the respective busbars can be introduced properly and easily.

Preferably, said translatory direction runs substantially at right angles to said plane. That is, the movement limitation for the contact element occurs toward the plane and away from the plane. This is advantageous for the loading of the bearing point, since it can have a more robust construction thanks to its protruding from the side wall which is oriented in the transverse plane. Hence, for example, the number of inserting cycles can be increased.

Especially preferably, all bearing points providing a movement limitation in said translatory direction at right angles to said plane protrude from said side wall, oriented in said transverse plane.

By the term "busbar" is meant a rigid contact element with preferably a substantially rectangular cross section. The size of the cross section and also the length of the busbar is of no significance to the use of the connection element.

By the term "movement limitation" is meant that the bearing points provide an end stop which limits the movement of the contact element in the corresponding direction. The limitation may be such that no movement of the contact element is allowed, or such that a play is created, within which the contact element can move. Preferably, the contact element is mounted floating, i.e., with play, in said bearing point.

Preferably, one of said bearing points is a double bearing point, which starting from a middle position of the contact element provides a movement limitation for the contact element in two oppositely running translatory directions.

Said double bearing point, standing alone, thus provides a movement limitation in two oppositely running translatory directions. That is, with a single bearing point the movement of the contact element connected to the bearing point can be limited in two translatory directions.

By the formation of at least one double bearing point, providing the corresponding movement limitation, a corresponding bearing system can be achieved very easily, by a double bearing point. That is, the double bearing point takes on the function of a bearing system in two degrees of freedom, representing an advantageous double function.

The double bearing point furthermore has the advantage in manufacture, as well as in operation, if a single bearing point provides said movement limitation. In this way, two different elements do not have to be oriented to each other.

By the term "two oppositely running translatory directions" is meant that the two translatory directions run in directions running opposite to each other. Thus, the bearing points provide a movement limitation starting from a middle position of the contact element in the positive as well as the negative translatory direction, the positive and the negative translatory direction running in the same axial direction, yet opposite to each other.

Alternatively or additionally, one of the mentioned bearing points is a single bearing point, which starting from a middle position of the contact element provides a movement limitation for the contact element in one translatory direction.

Both double bearing points and single bearing points or solely double bearing points or solely single bearing points may be arranged on the same housing.

In a first embodiment, at least three, preferably four double bearing points are arranged. Two double bearing points protrude from the same side into the interior. One double bearing point or two double bearing points protrude from a side wall situated opposite said side wall into the interior.

Preferably, all double bearing points in the first embodiment are similar to each other, specifically in that starting from a middle position of the contact element they provide a movement limitation for the contact element in two oppositely running translatory directions.

In a second embodiment, at least one double bearing point and at least two single bearing points are present. From a first side wall at least one double bearing point protrudes into the interior. From a side wall situated opposite the first side wall, at least two single bearing points protrude into the interior. One of the two single bearing points limits the movement in one of the translatory directions and the other of the two single bearing points limits the movement in the opposite translatory direction.

In a third embodiment, four single bearing points are present. From a first side wall at least two single bearing points protrude into the interior, wherein one of the two single bearing points limits the movement in one of the translatory directions and wherein the other of the two single bearing points limits the movement in the opposite translatory direction. From a side wall situated opposite the first side wall at least two single bearing points protrude into the interior, wherein one of the two single bearing points limits the movement in one of the translatory directions and wherein the other of the two single bearing points limits the movement in the opposite translatory direction.

Preferably, in all embodiments two bearing points are situated opposite each other with respect to the interior, wherein these two oppositely situated bearing points starting from a middle position of the contact element provide a movement limitation for the contact element in two oppositely running second translatory directions, the second translatory direction running substantially transversely to the inserting direction and parallel to the plane. That is, the bearing points provide a movement limitation for the contact element with respect to the first translatory direction, which is oriented preferably substantially at right angles to the plane, and with respect to the second translatory direction, which is oriented substantially transversely to the longitudinal axis or to the inserting direction and parallel to the plane.

The two groups of bearing points in the case of double bearing points are arranged such that they together provide the movement limitation in the corresponding first and second directions. With respect to the direction transversely to the longitudinal axis, the one group provides a movement limitation from a starting position in the positive direction and the opposite negative direction.

Preferably, the double bearing point has a slot to receive parts of a carrier strip of the contact element. In particular, edge regions of the contact element, especially those of the carrier strip or the entire carrier strip, protrude into the slot of the bearing point and are supported there accordingly.

The slot in this case provides the movement limitation in both directions.

Preferably, the slot in one direction at right angles to said plane is configured broader than the thickness of the contact element, especially that of the carrier strip, such that a play is provided between the slot and the contact element. That is, the contact element is supported with play in the slot in the direction of the second direction. The slot provides the movement limitation, as mentioned, and the contact element can be moved within this movement limitation in the bounds of said play.

The single bearing point is preferably provided by a bearing surface. The contact element lies against the bearing surface.

Preferably, the slots or the bearing surfaces within one group of bearing points are offset from each other with respect to the plane. Thanks to the offset arrangement, the contact element can lie with a slight tilt in the interior, which makes the inserting process of the busbars easier.

Especially preferably, the slots or bearing surfaces are arranged such that the slots or bearing surfaces lying closer to an entrance opening, looking in the inserting direction, are situated at a greater distance from the wall coming into contact with the busbar than the slots or bearing surfaces lying further away from the entrance opening.

Preferably, the bearing points in all embodiments are webs bent out from the housing and protruding into the interior, the webs protruding from one side wall of the housing. The webs stand in connection with the housing as a single piece and are plastically deformed so that the webs are placed in their position.

Especially preferably, the slot is arranged at the free end of the web and extends into the web at an end face closing off the free end. The slot is open in the end face. That is, the contact element can be inserted via the end face into the slot. The bearing surface is likewise preferably arranged at the free end of the web.

Preferably, the webs are inclined at an angle relative to the longitudinal axis, the angle being between 10° and 170°, especially between 30° and 150°.

Preferably, the contact element is mounted floating in the interior in two third translatory directions running opposite to each other, extending parallel to the inserting direction, so that the contact element can move in this third translatory direction within certain limits, limits being provided by an end stop.

Preferably, the housing is provided by a wall, two side walls formed at opposite edges from the wall and protruding substantially perpendicular from the wall, and by side edges formed on the side walls.

Preferably the bearing points or the webs, as described above, are molded as a single piece on the housing and protrude from the side walls into the interior, the bearing points being preferably bent out from the side walls.

Preferably the housing has one or more installation openings, which are preferably arranged such that access to the carrier strips for a tool can be created.

The one or more installation openings reach through the housing such that a tool can engage from the outside into the interior.

Preferably the contact element, especially the carrier strip, has one or more installation openings, in which a tool can engage. Thanks to this engagement, the contact element can be placed in the interior.

Preferably the housing is fabricated from a metallic material and preferably by a punching and forming process. The housing is preferably a single piece.

Further optional features or advantages shall be described below.

Preferably the resilient contact web exerts a restoring force against the respective busbar when it establishes the electrical contact between the busbars. This creates a durable and defined electrical contact.

Preferably the contact element is arranged such that it comes to lie between the first busbar and the second busbar when the busbars protrude into the respective receiving space.

The contact element is preferably mounted floating in the interior, so that it is movable or displaceable perpendicular to the plane toward the first receiving space or toward the second receiving space within defined limits, which are provided by the bearing point or the bearing points. Defined limits can mean, for example, the equalizing of tolerances. The floating mount has the advantage that tolerances are automatically evened out.

The contact element may have various designs. It is important that the contact element has resilient contact points, so that a durable contact can be produced between the busbars.

In one especially preferred variant, the contact element is configured as follows. The contact element comprises two carrier strips running parallel to each other and in the direction of a longitudinal axis and at least one resilient contact web, which connects the two carrier strips. The carrier strips define a substantially flat plane, which divides the interior into the two receiving spaces.

The especially preferred contact element comprises preferably a plurality of contact webs, which stand in connection with at least one carrier strip, situated in the plane, while the contact webs stand in connection with the at least one carrier strip such that they are movable in resilient manner with respect to the strip, especially rotatable or swivelable. Preferably, the contact webs lie at an angle to the plane, the contact element being situated in the interior such that the angle during the inserting of the busbar into the respective receiving space becomes smaller, while the contact webs preferably lie parallel to each other. Furthermore, the contact webs extend, looking from the plane, on both sides of the plane and protrude beyond the respective side of the plane. Preferably, the contact webs stand in connection with the at least one carrier strip by torsion spring joints.

One preferred modification of the connection element is characterized in that the two receiving spaces each have at least one entrance opening, through which the respective busbar protrudes into the corresponding receiving space, the first receiving space being accessible through a first entrance opening from a first side and the second receiving space through a second entrance opening from a second side, the first side being preferably situated opposite the second side.

Another preferred modification of the connection element is characterized in that each receiving space has at least one end stop element, which is situated at a spacing from the contact element in a direction perpendicular to the plane of the contact element, the respective busbar lying against the end stop element, and a force from the contact element pressing the busbar against the respective end stop element being produced by the resilient contact webs.

Preferably, the end stop element has the shape of said wall or said side edge.

A further preferred modification of the connection element is characterized in that the housing furthermore has at least one end stop element for busbars, the at least one end stop element protruding into the entrance opening such that the busbar not through the respective entrance opening comes up against the end stop element.

A further preferred modification of the connection element is characterized in that the housing has guide elements in the area of the entrance openings, making it easier to insert the busbars.

A further preferred modification of the connection element is characterized in that the distance between contact element and housing in the first receiving space is equal to the distance between contact element and housing in the second receiving space, or in that the distance between contact element and housing in the first receiving space is less than or greater than the distance between contact element and housing in the second receiving space.

One layout comprises a connection element as described above, a first busbar and a second busbar arranged in parallel with the first busbar, wherein the first busbar protrudes into the first receiving space and the second busbar into the second receiving space, and between the two busbars an electrical contact is established by the contact element arranged between the first receiving space and the second receiving space.

Further embodiments are indicated in the dependent claims.

BRIEF DESCRIPTION OF THE DRAWINGS

Preferred embodiments of the invention shall be described below with the aid of drawings, serving only as an explanation and not to be interpreted in limiting fashion. The drawings show.

DESCRIPTION OF PREFERRED EMBODIMENTS

Figure 1:
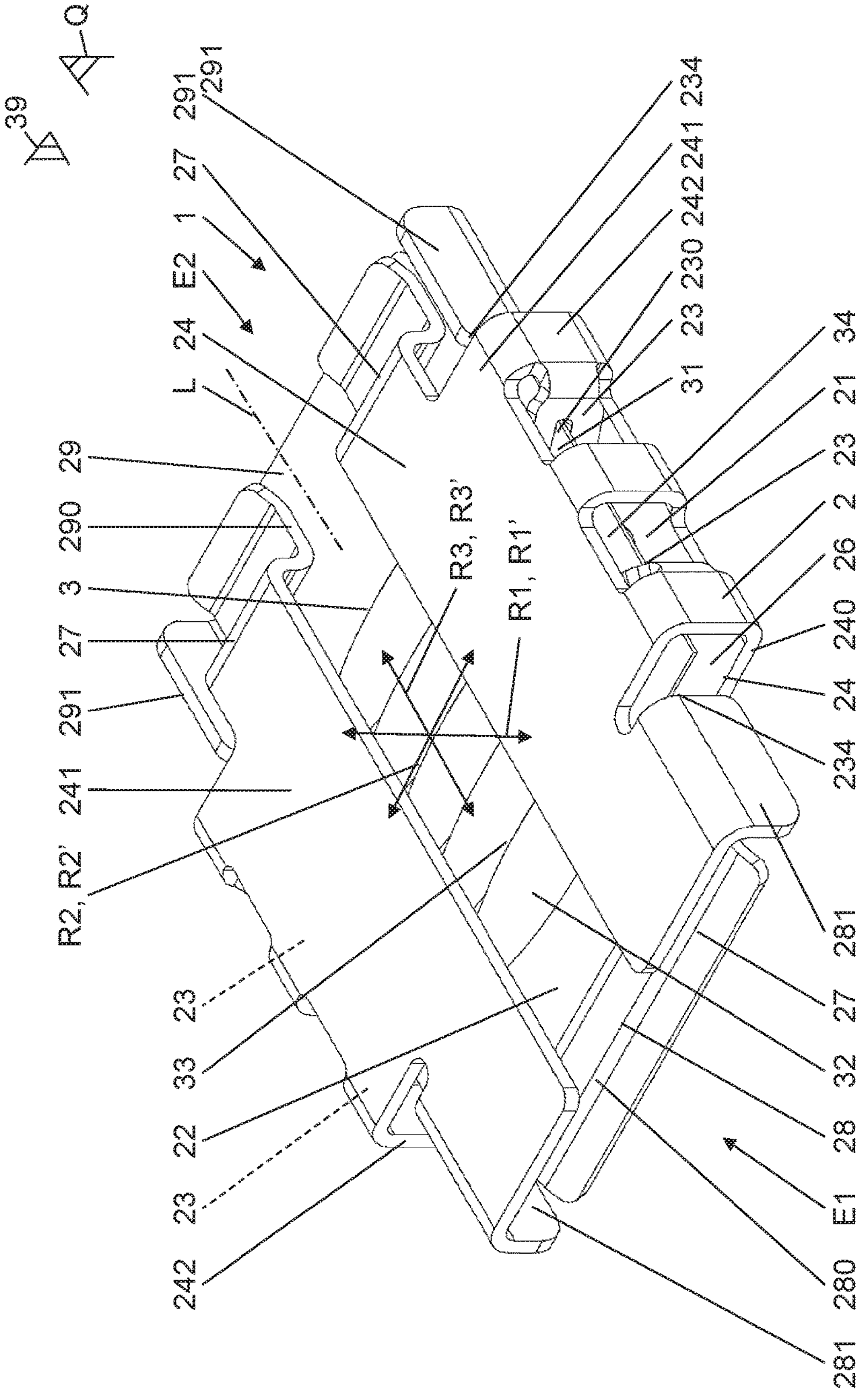
FIG. 1, a perspective view of a connection element according to one embodiment of the present invention without busbars, seen from above.
Figure 2:
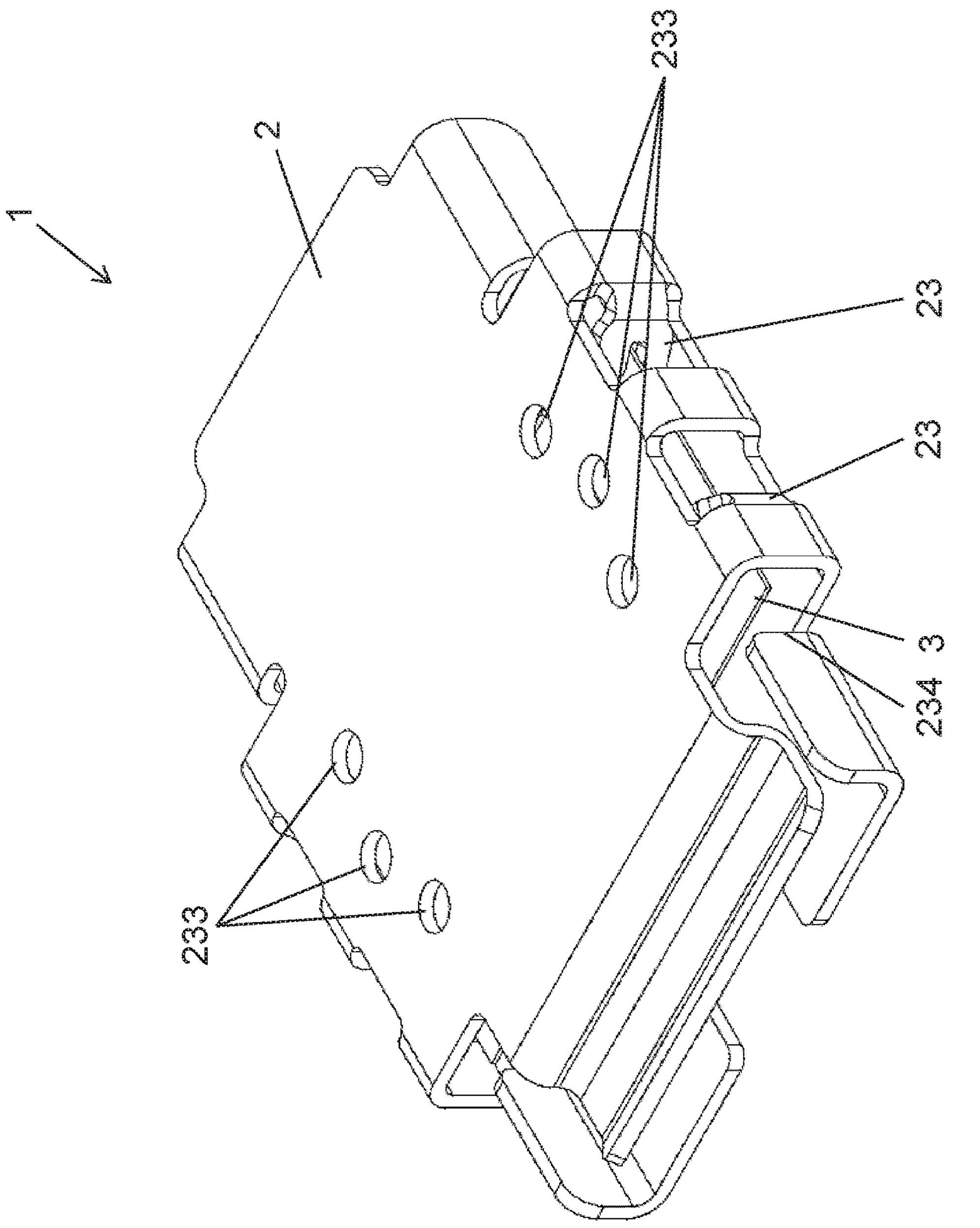
FIG. 2, a perspective view of the connection element of FIG. 1, seen from below.

FIGS. 1 and 2 show a connection element 1 with which an electrical contact can be established between two busbars. The connection element basically comprises a housing 2 and a contact element 3 arranged in the housing 2, by which the electrical contact can be produced between the busbars.

Figure 3:
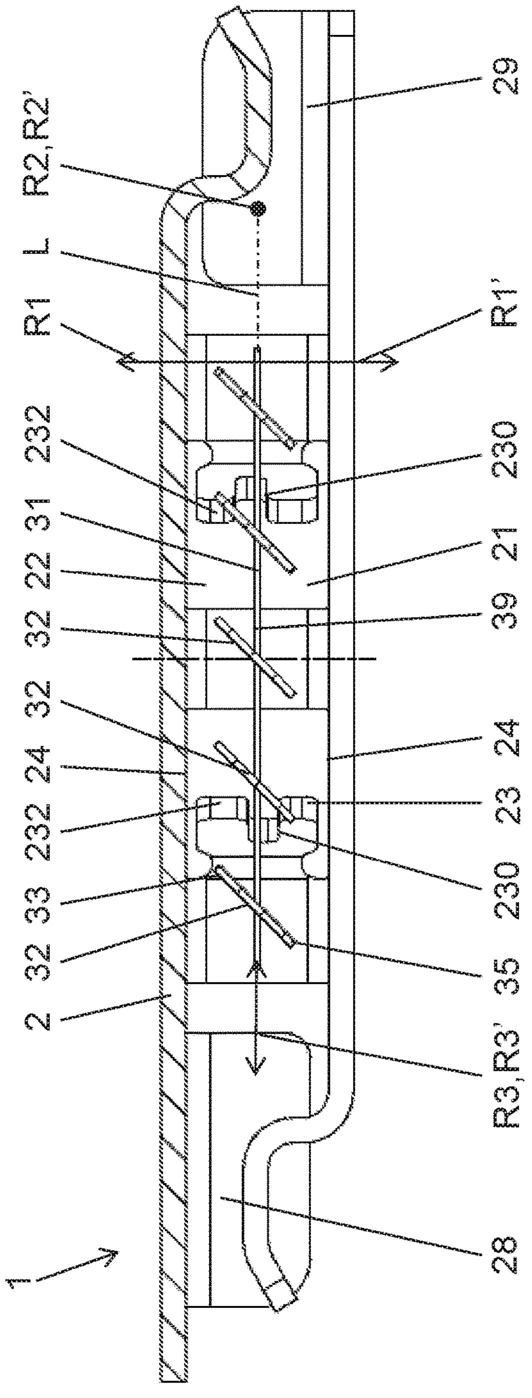
FIG. 3, a sectional representation of the connection element of FIG. 1, without busbars.
Figure 4:
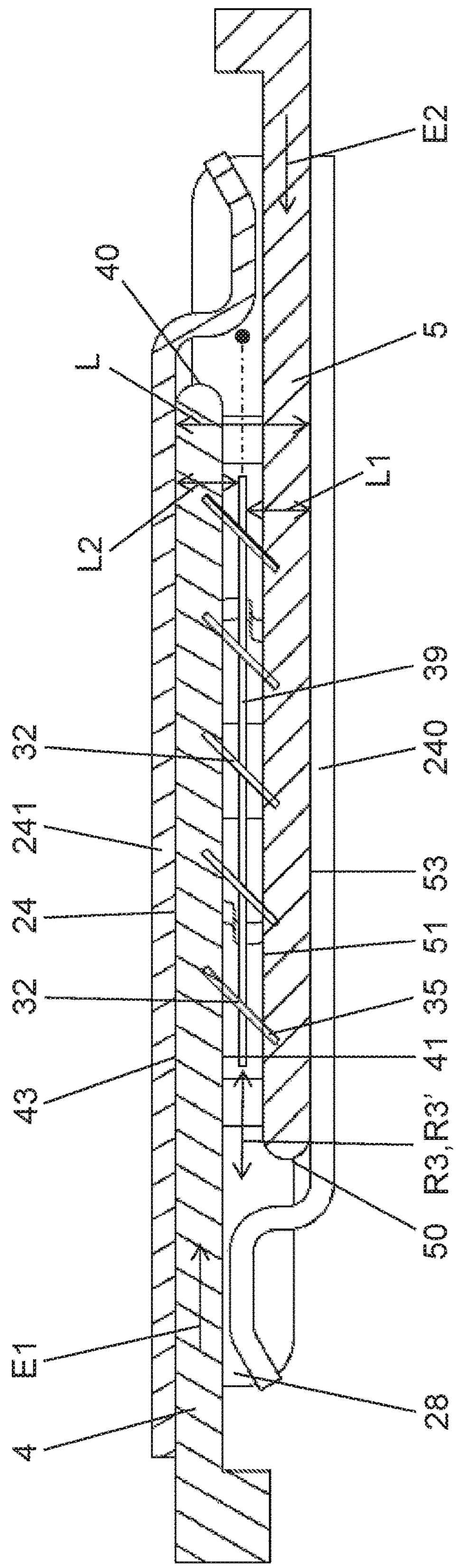
FIG. 4, a sectional representation of the connection element of FIG. 1, with busbars.

FIGS. 3 and 4 show the cross section of the connection element 1. The housing 2 basically comprises an interior 20 accessible from the outside, which is divided by the contact element 3 into a first receiving space 21 and a second receiving space 22. The interior 20 is bounded by a wall 240, two side walls 242 formed at opposite edges from the wall 240 and protruding substantially perpendicular from the wall 240, and side edges 241 formed on the side walls 242. In other words, it may also be said that the wall 240, the side walls 242 and the side edges 241 provide a tunnel-shaped interior 20, which is accessible through openings 28, 29 situated opposite each other. The tunnel-shaped interior 20 may also be completely enclosed by an encircling side wall, and then the side edges 241 are likewise formed as a wall or stand in connection with each other, and the openings 28, 29 likewise afford access to the interior. The wall 240 and the side edges 241 each extend in a flat plane and are spaced apart from each other, the spacing defining the clear width L of the interior. Preferably the interior is cuboidal.

The two receiving spaces 21, 22 basically serve for receiving the respective busbars 4, 5. The first receiving space 21 is accessible through a first entrance opening 28 and the second receiving space 22 through a second entrance opening 29. The busbars 4, 5 are led into the respective receiving space through these entrance openings 28, 29.

The contact element 3 lies in a plane or defines a plane 39 which extends at least partly through the interior 20. The plane 39 preferably lies in the middle between the two busbars and extends parallel or substantially parallel or slightly at an angle to them. In other words, the plane 39 extends preferably through the middle of the contact element 3.

The contact element 3 shown in the figures is one possible example of an especially preferred contact element. But it is also conceivable to use other contact elements, which likewise extend in a plane and comprises resilient contact areas.

Figure 5A:
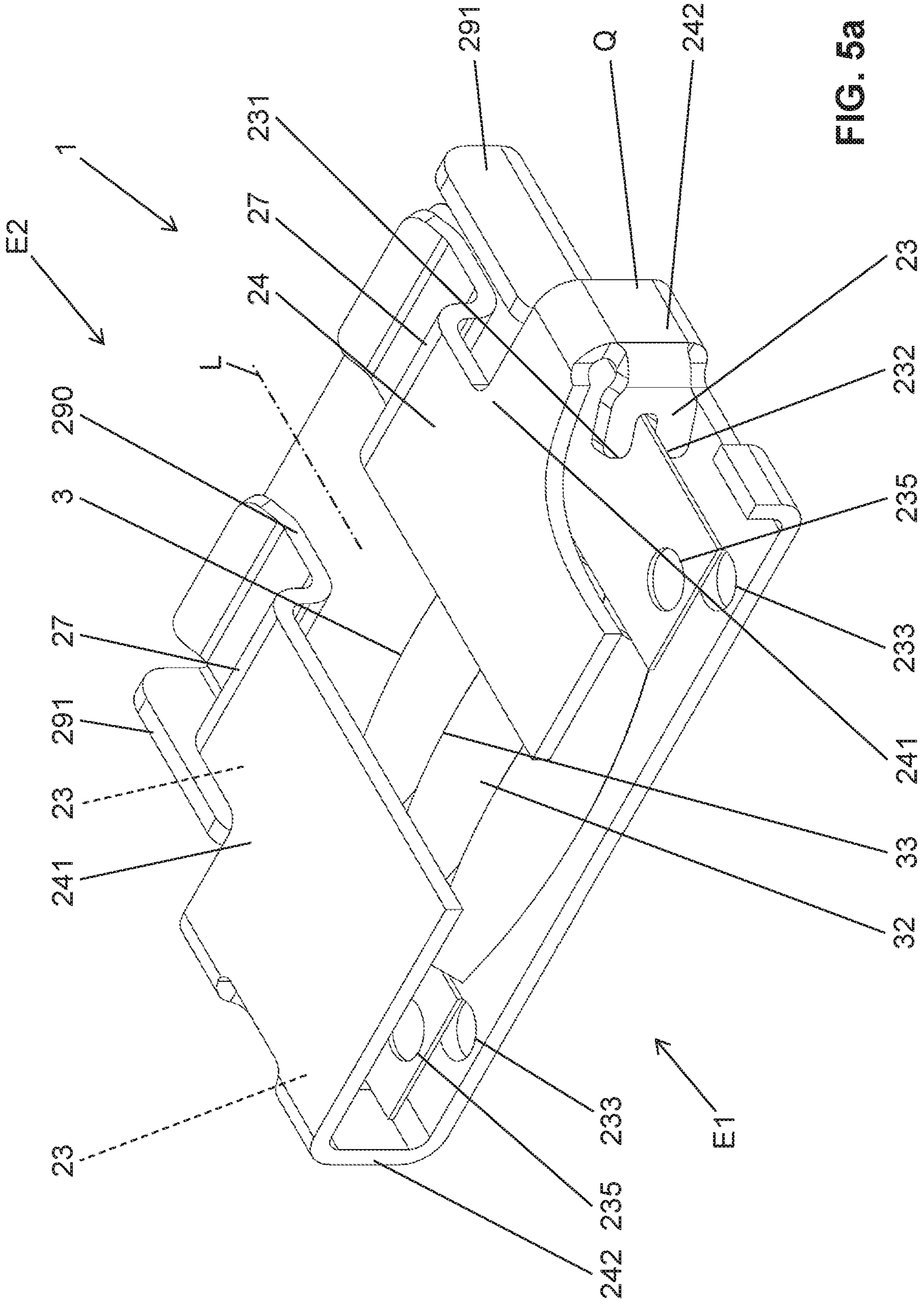
FIG. 5*a*, a partial sectional representation through the connection element of FIG. 1, with a bearing point configured as a double bearing point.

The mounting of the contact element in the interior shall now be explained more closely with the aid of FIG. 3 to 5.

The contact element 3 is held in the interior 20 by bearing points 23. The bearing points 23 are preferably formed as a single piece with the housing and protrude into the interior 20. In the embodiment shown, double bearing points are depicted.

In the embodiment shown, the bearing points 23 are configured such that, starting from a middle position of the contact element 3, they provide a movement limitation for the contact element 3 in two oppositely running translatory directions R1, R1'. That is, the contact element 3 is mounted in the bearing points 23 such that it is held within the movement limitation either fixed or within a play provided by the bearing point 23.

Thanks to such a configuration, the contact element 3 is mounted in the bearing point 23 in two oppositely running directions.

The translatory directions R1, R1' run opposite each other and in the present case substantially at right angles to the plane 39.

In the present embodiment, two times two bearing points 23 are arranged opposite each other with respect to the interior, these two oppositely arranged bearing points 23 starting from a middle position of the contact element 3 providing a movement limitation for the contact element in two oppositely running second translatory directions R2, R2'. The second translatory direction R2, R2' runs substantially transversely to the inserting direction and parallel to the plane 39.

Regarding the number of bearing points 23, a total of four bearing points 23 are present here, each time a group of two bearing points 23 protruding from the same side into the interior 20. Two groups of two bearing points 23 each are situated opposite each other with respect to the interior 20.

The bearing point 23 in the embodiment shown has a slot 230, which is designed to receive parts of the carrier strip 31. It can be well seen in FIG. 5*a* how an edge region of the carrier strip 31 protrudes into the slot 230.

Figure 5B:
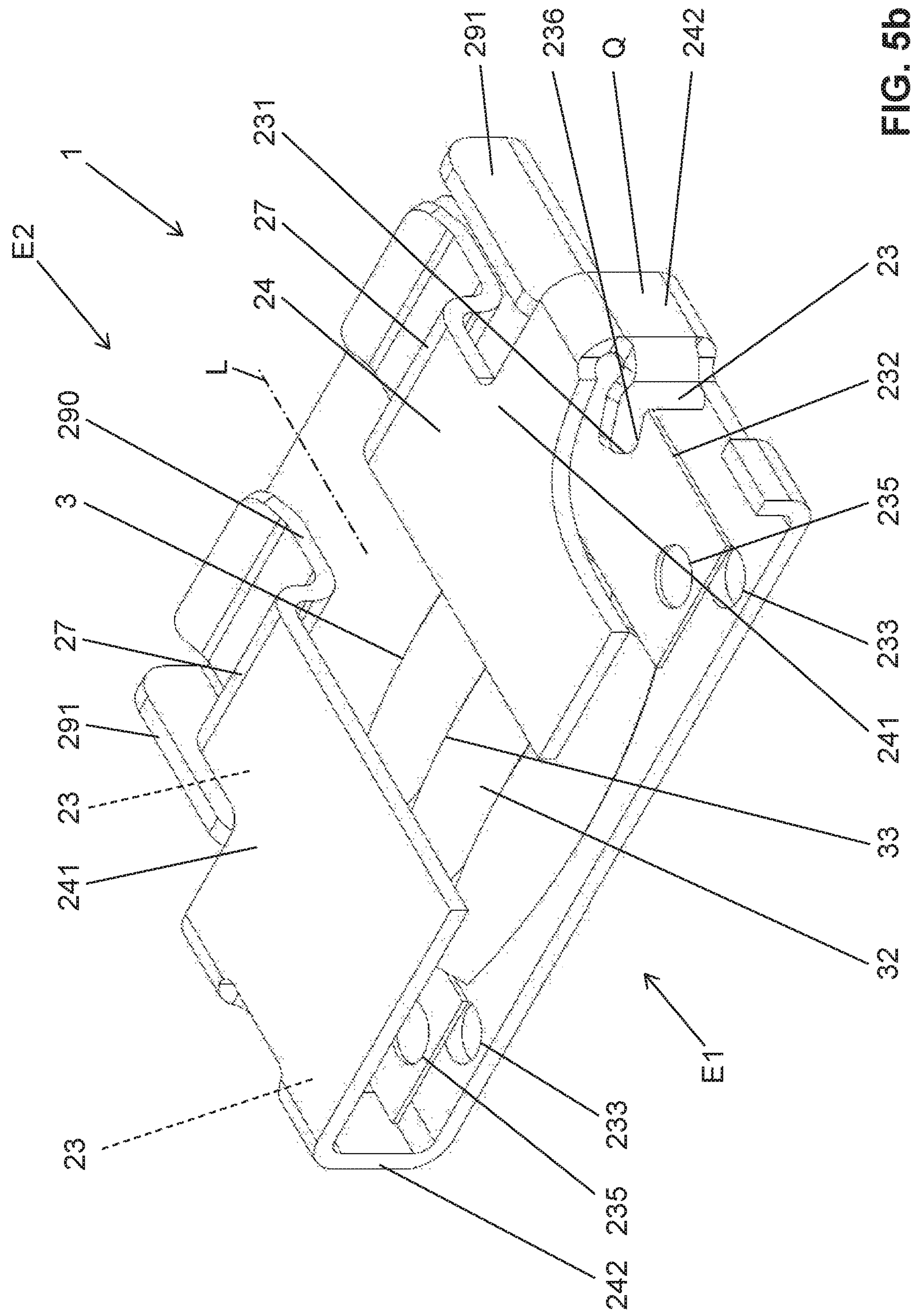
FIG. 5*b*, a partial sectional representation through the connection element of FIG. 1, with a bearing point configured as a single bearing point.

FIG. 5*b* shows an alternative variant of the bearing point, the alternative variant of the bearing point comprising a bearing surface 236, which provides the movement limitation.

In the variant shown, the slot 230 in one direction at right angles to said plane is configured broader than the thickness of the carrier strip. The width is such that a play is produced between the slot and the carrier strip. That is, the carrier strip 31 and thus also the contact element 3 as such can move within the play in the slot 230. The play has the advantage that the contact element 3 is forced slightly away from the first busbar as it is inserted and once again forced toward the first busbar when the other busbar is inserted. This has the advantage that tolerances in the thickness of the busbars 4, 5 or in the clear width of the receiving spaces can be evened out, and it can thereby be ensured that the contact element 3 always lies in the middle between the two busbars 4, 5 during the contacting process.

Alternatively, the slot 230 could also have the same thickness as the carrier strip 31, so that no play is produced.

It can be well seen in FIG. 3 that the slots 230 are offset from each other relative to the plane 39 within one group of bearing points 23. The left-hand slot 230 here is higher than the right-hand slot 230.

Preferably, the slots 230 lying closer to the entrance opening 28, 29, looking in the inserting direction E1, E2, are situated at a greater distance A1, A2 from the wall 240 coming into contact with the busbar 4, 5 than the slots further away from the entrance opening 28, 29. Such an arrangement makes it easier to insert the busbars 4, 5, because the contact element lies at a slight inclination in the interior 20.

The bearing points 23 here are fashioned as webs, which are bent into the interior 20. In the present embodiment, the bearing points 23 are provided as parts of the side wall 242 and protrude out from the side wall 242.

Said slot 230 is arranged at the free end 231 of the web and extends into the web at an end face 232 closing off the free end 231. The slot is open in the end face 232.

The webs are inclined at an angle to the longitudinal axis L, the angle being between 10° and 170°, especially 30° to 150°.

Moreover, the contact element 3 is mounted floating in the interior 20 in two third translatory directions R3, R3' running opposite to each other, extending parallel to the inserting direction E1, E2 or to the longitudinal direction L, so that the contact element 3 can move in this third translatory direction R3, R3' within defined limits, the limits being provided by an end stop 234. The end stop 234 in the embodiment shown is provided by the inserting aid 281 and 291.

The housing 2, as is shown in particular in FIGS. 2 and 5, has several installation openings 233, which are preferably arranged such that access to the carrier strips 31 for a tool can be created. Moreover, the carrier strip 31 also preferably has installation openings planar in which a tool can engage. The installation openings 235 are shown in FIG. 5.

Figure 6:
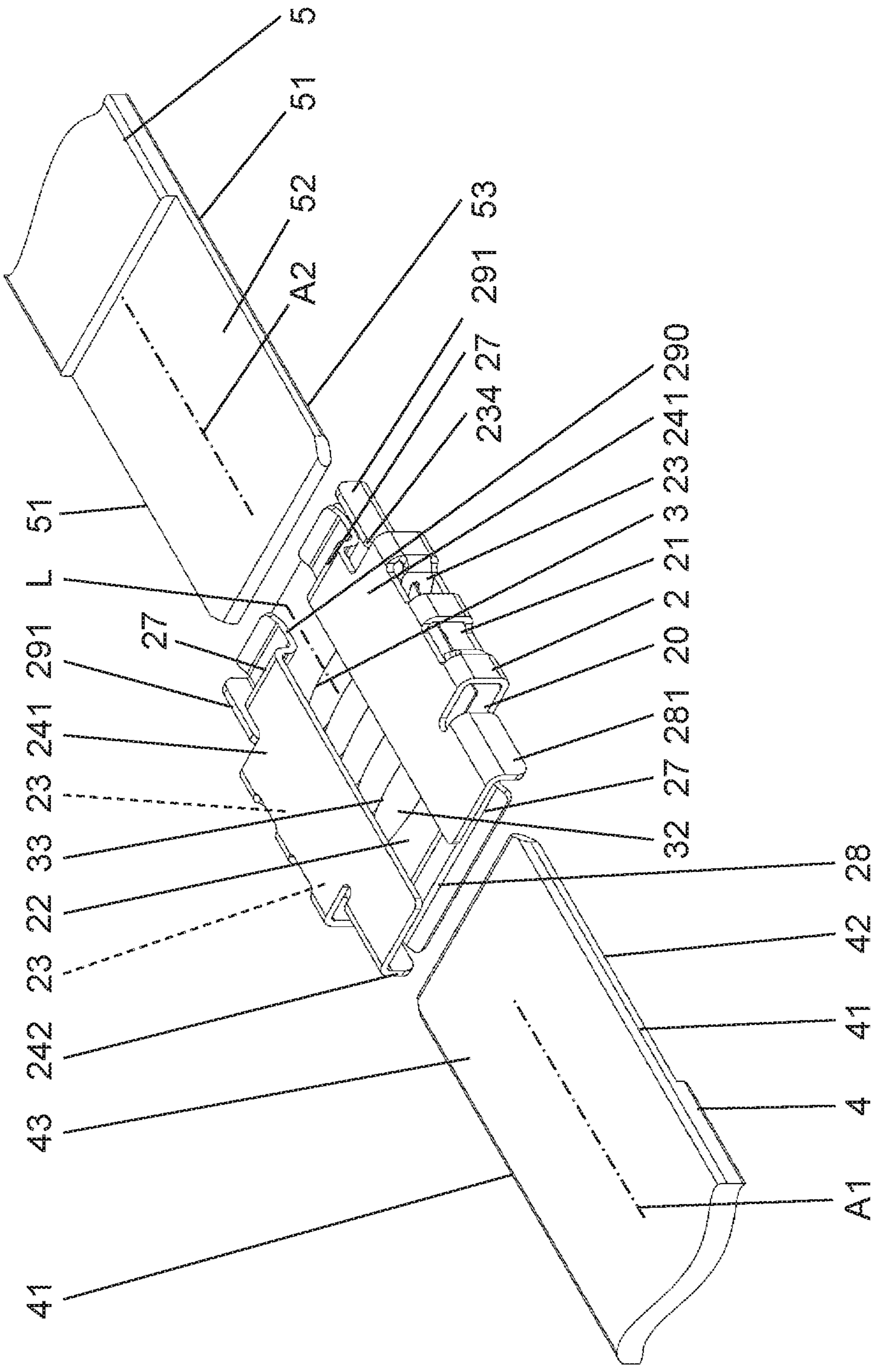
FIG. 6, a perspective view of the connection element of FIG. 1 with busbars not yet inserted.
Figure 7:
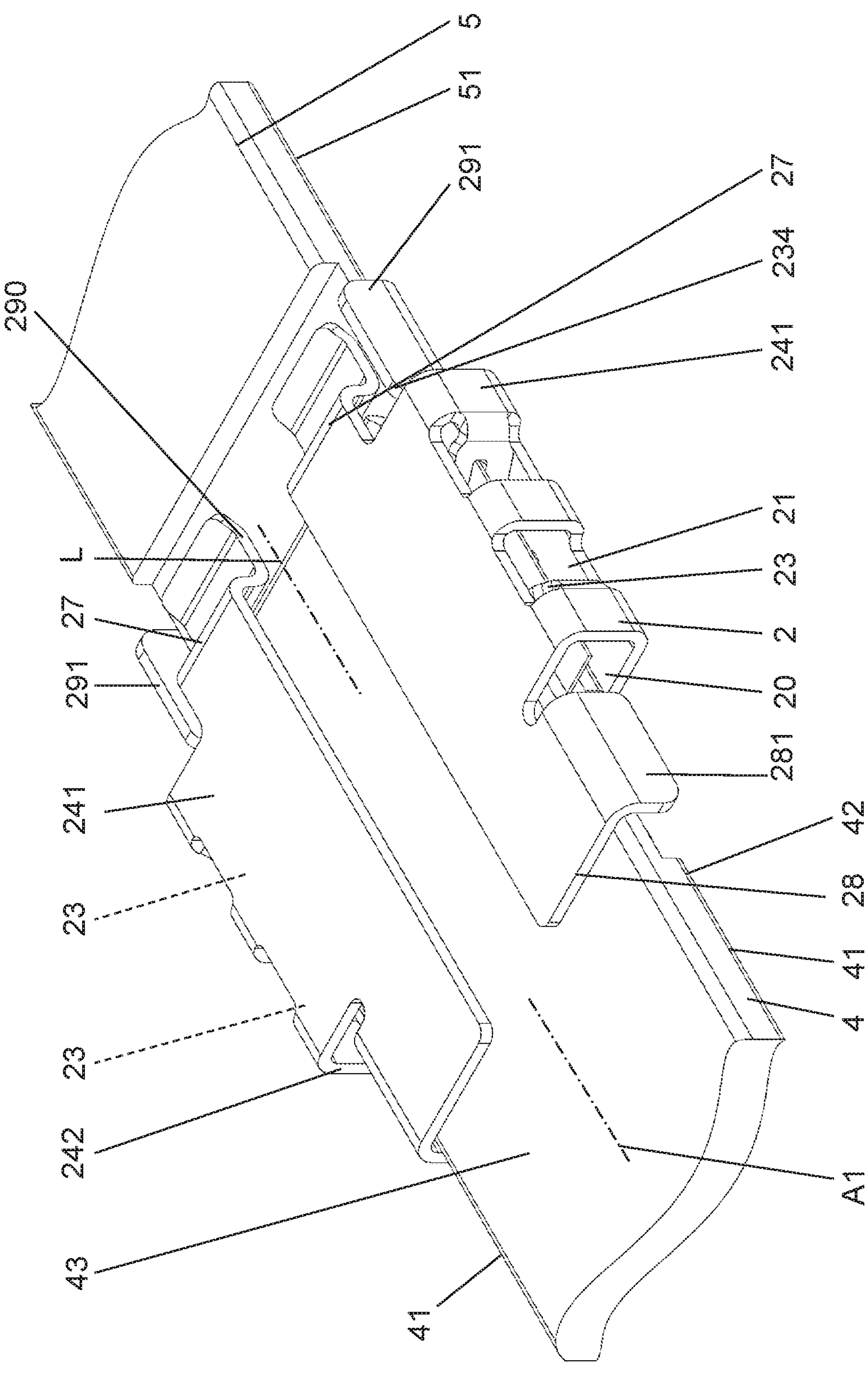
FIG. 7, the view per FIG. 6 with busbars inserted.

FIGS. 4, 6 and 7 show the connection element 1, which stands or comes into connection with a first busbar 4 and a second busbar 5. The two busbars 4, 5 here have a rectangular cross section and extend along a longitudinal axis A1 and A2. In the present embodiment, the respective longitudinal axes A1 and A2 run in parallel and are offset from each other. Furthermore, the axes A1 and A2 are situated parallel to the aforementioned plane 39. The busbars may have identical dimensions to each other, or they may have different thicknesses or widths. Each of the two busbars has an end face 40, 50, two side walls 41, 51, a contact surface 42, 52 facing the contact element 3, and a surface 43, 53 facing the housing 2. The contact surfaces 42, 52 here are fashioned as stepped surfaces.

The contact element 3 in the present embodiments is represented as a contact blade, having two carrier strips 31 extending along a longitudinal axis and a plurality of consecutively arranged contact webs 32. The contact webs 32 stand in connection with the carrier strips 31 on both sides. The carrier strips 31 substantially define the aforementioned plane 39. The contact webs 32 are resilient, in the present case due to a torsional segment in the area of the connection to the carrier strip 31. The torsional segment may be called a torsion spring joint 34, for example. The contact element 3 may also have a different configuration. In other embodiments, the contact element 3 should have resilient elements which can apply a spring force perpendicular to the carrier strip 31 or to the longitudinal direction A or to the plane 39, so that the two busbars are pressed away from each other by the resilient elements against a respective end stop, as shall be described below. However, it should be ensured that the contact webs 32 always stand in connection with both busbars 4, 5, so that a plurality of defined contact points can be provided.

The two busbars 4, 5 extend, at least in the region in which they protrude into the housing 2, parallel to and offset from each other, so that a gap is created between the two busbars, in which the contact element 3 can come to rest. That is, the contact surfaces 42, 52 run substantially parallel to the plane 39. The contact surfaces 42, 52 of the busbars 4, 5 stand in connection with the contact webs 32, that is, the contact webs 32 rest against both the contact surface 42 of the first busbar 4 and the contact surface 52 of the second busbar 5 and thus establish the electrical contact between the two busbars 4, 5.

By the term busbar is meant any element extending along a central axis and conducting electric current. Such busbars are used, for example, to carry energy in vehicles, such as hybrid passenger cars, or public transit vehicles. In this case, currents in the range of 100 to 1000 Amperes are carried. Lower currents are also conceivable, especially in the field of electric bikes.

By the term resilient is meant the action of a spring force or a restoring force. The restoring force acts on the contact web when it is moved from its original position into a working position or contact position. That is, the restoring force acts during a contacting between the contact webs and the busbars.

Since the contact element 3 comes to lie in the middle between the two busbars 4 and 5, it may also be said that the carrier strips 31 lie in the plane 39 or define this plane 39. The contact webs 32 extend, looking from the plane 39 or from the carrier strip 31, both above the plane 39 and below the plane 39. This means, in other words, that the contact webs 32 at least in the noncontacting condition extend or stick out on both sides of the plane 39 or the carrier strip 31.

The contact webs 32 stand at an angle α to the plane 39 or to the carrier strip 31. Preferably, the angle α is between 20° and 70°, especially preferably between 30° and 60°. Preferably, all contact webs 32 stand at the same angle to the carrier strip. That is, all contact webs 32 run parallel to each other at least in the noncontacting condition.

The contact element 2, is made from a material conducting electric current, such as a spring bronze or a copper alloy.

FIG. 4 shows a sectional representation of the connection element 1 with inserted busbars 4, 5 and FIG. 3 shows a sectional representation of the connection element 1 without busbars.

Each of the receiving spaces 21, 22 of the housing has at least one end stop element 24, which is arranged at a spacing from the contact element 3 in a direction perpendicular to the plane 39. The respective busbar lies against the end stop element 24, which are forced away from the contact element 3 by a force provided by the resilient contact webs 32. In this way, the respective busbar is pressed against the corresponding end stop element 24.

In the embodiment shown in the figures, the end stop element 24 on the one hand has the shape of a wall 240 and on the other hand the shape of a side edge 241. The wall 240 serves as an end stop element for the second busbar 5 and the two side edges 241 serve as an end stop element for the first busbar 4.

The wall 240 may also be called a housing wall, while two side walls 242 stand away from the wall substantially perpendicular to two opposite edges, one side edge 241 being formed respectively at the free end of the side wall 242.

Each of the two receiving spaces 21, 22 has a clear width L1, L2, which is less than the thickness of the respective busbar 4, 5. The clear width is defined as the distance between the upper edge 33 or lower edge 35 of the contact web 32 and the end stop element 24. By the choice of the smaller clear width, the spring action of the contact webs 32 when making the connection can be ensured. The clear width is accordingly defined in terms of the thickness of the busbar being inserted.

When the first busbar 4 is inserted, the contact element 3 is slightly lifted on account of the floating mount, while the contact webs 32 are not yet deflected, or only slightly so. Then, if the second busbar 5 is inserted, the contact webs 32 are rotated, since the busbar 5 rotates each of the contact webs by the upper edge 33. The rotation occurs at the torsion spring joints 34 of the contact blade or the contact element 3. Thanks to the arrangement of the torsion spring joint 34, a constant force acts on the first busbar 4 and the second busbar 5 as described above, since the contact blades due to the prestressing force from the torsion spring joints 34 strive to return to their original position. In other words, the first busbar 4 is pressed by a force provided by the torsion spring joints 34 against the end stop 24 when the second busbar 5 is inserted.

But depending on the dimension it is also possible for the contact webs 32 to be rotated upon inserting of the first busbar 4, since the busbar 4 displaces each of the contact webs by the lower edge 35.

When the second busbar 5 is inserted, if the first busbar 4 is already present in the first receiving space 21, the second busbar 5 thus contacts the contact webs 32 across the upper edge 33. The dimension of the busbars 4, 5 is chosen such that a force provided by the torsion spring joints 34 is always acting on both busbars 4, 5 and forces them to the outside, i.e., against the end stop elements 24.

Regardless of the designation of the two busbars, it is also possible for the second busbar 5 to be inserted before the first busbar 4, and the above described processes will equally apply.

The contact element 3 here is arranged in the interior such that, when the busbars are inserted, the angle α between the contact webs 32 and the carrier strip decreases. The contact webs 32 are situated with respect to the busbar such that the busbar presses the respective contact web 32 by a swivel movement toward the carrier strip 31 or the plane 39. During the inserting process, the busbar 4, 5 contacts, by the edge formed by the end face 40 and the contact surface 42, the surface of the contact web 32 facing the edge and then forces it against the carrier strip, whereupon the contact web 32 rests against the contact surface 42 by the corresponding upper edge 33 or lower edge 35.

In other words, it may also be said that the two busbars 4, 5 are forced away from each other by the torsion spring joints 34 and the contact webs 32, the busbars 4, 5 resting against the respective end stop elements 24. The dimensions of the busbars 4, 5, the receiving spaces 21, 22 and the contact element 3 are chosen such that a force acts from the contact element 3 on the busbars 4, 5 substantially at all times. This is accomplished in that the distance between the two busbars in the condition positioned in the housing is less than the distance between the upper edge 33 and the lower edge 35 of the contact webs, looking perpendicular to the busbars.

Thanks to the stability of the housing 2, this force remains constant during the entire period of use, which is of great benefit in regard to the defined contacting between contact webs 32 and the respective contact surface 42, 52 of the busbars 4, 5. A defined contacting is a precondition for a good and constant transfer of electric energy over the entire service life.

The respective receiving space is bounded by a corresponding boundary element 27 in the direction of the respective longitudinal axis A1 or A2. The boundary element 27 extends from the respective end stop elements 24 substantially perpendicular or at an angle, so that the respective receiving space 21, 22 is bounded by the boundary element 27. The boundary element 27 has basically two functions. On the one hand, the boundary elements 27 constitute an end stop for the busbars 4, 5.

In the region of the entrance openings 28, 29, moreover, inserting aids 280 and 290 may be provided. The two inserting aids 280, 290 stand at an angle to the longitudinal axis A, so that the clear width of the entrance openings 28, 29, looking from the interior 20, increases toward the end of the entrance opening 28, 29, so that when the respective busbar is inserted the cross section, or the clear width, decreases continuously. Side inserting aids 281, 291 in the form of tabs may be arranged to the left and right of the interior 20.

In the embodiment shown, the respective inserting aids 280, 281, 290, 291 stand in connection with the corresponding boundary element 27.

Preferably, the housing 2 is made of a metallic material, so that the stability of the housing remains constant over the entire service life. The choice of a metallic material furthermore has the benefit that the heat from the contact region between the two busbars can be carried away. Accordingly, the housing also acts as a cooling element. The housing can be fabricated for example from a metal sheet by punching, bending and/or forming.

Yet suitable plastics can also be used, paying attention to the shape stability, since a deformation of the housing over time may have negative impact on the quality of the electrical contact.

The housing 2 serves not only for providing the end stop elements in the direction perpendicular to the plane, but also provides for the guidance and positioning of the two busbars.

Preferably, the connection is produced as follows. In a first step, the connection element is inserted via the first busbar 4, so that this can protrude into the first receiving space 21. The contact webs 32 are moved by a swivel movement from the original position. In a second step, the second busbar 5 can be shoved into the second receiving space, whereby the second busbar 5 likewise makes contact with the contact webs.

Alternatively, the reverse process is also possible for making the connection, wherein the connection element is at first shoved in by the second busbar 5, so that this protrudes into the second receiving space 22, and then the first busbar 4 is inserted into the first receiving space 21. When the first busbar 4 is inserted, the contact webs 32 are then rotated or swiveled from the original position by a swivel movement, as described above.

Figure 8:
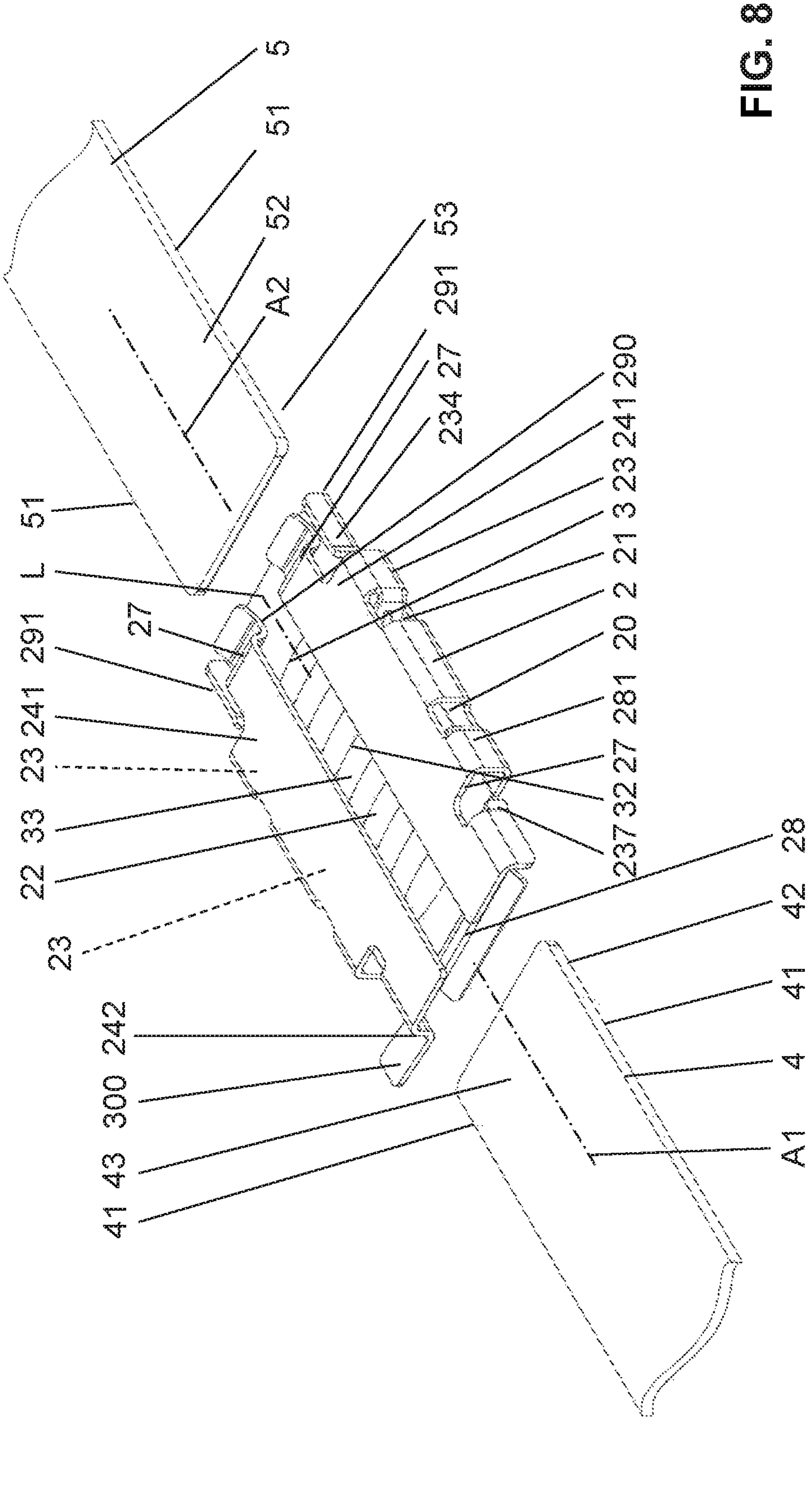
FIG. 8, a perspective view of another embodiment of the present invention.
Figure 9:
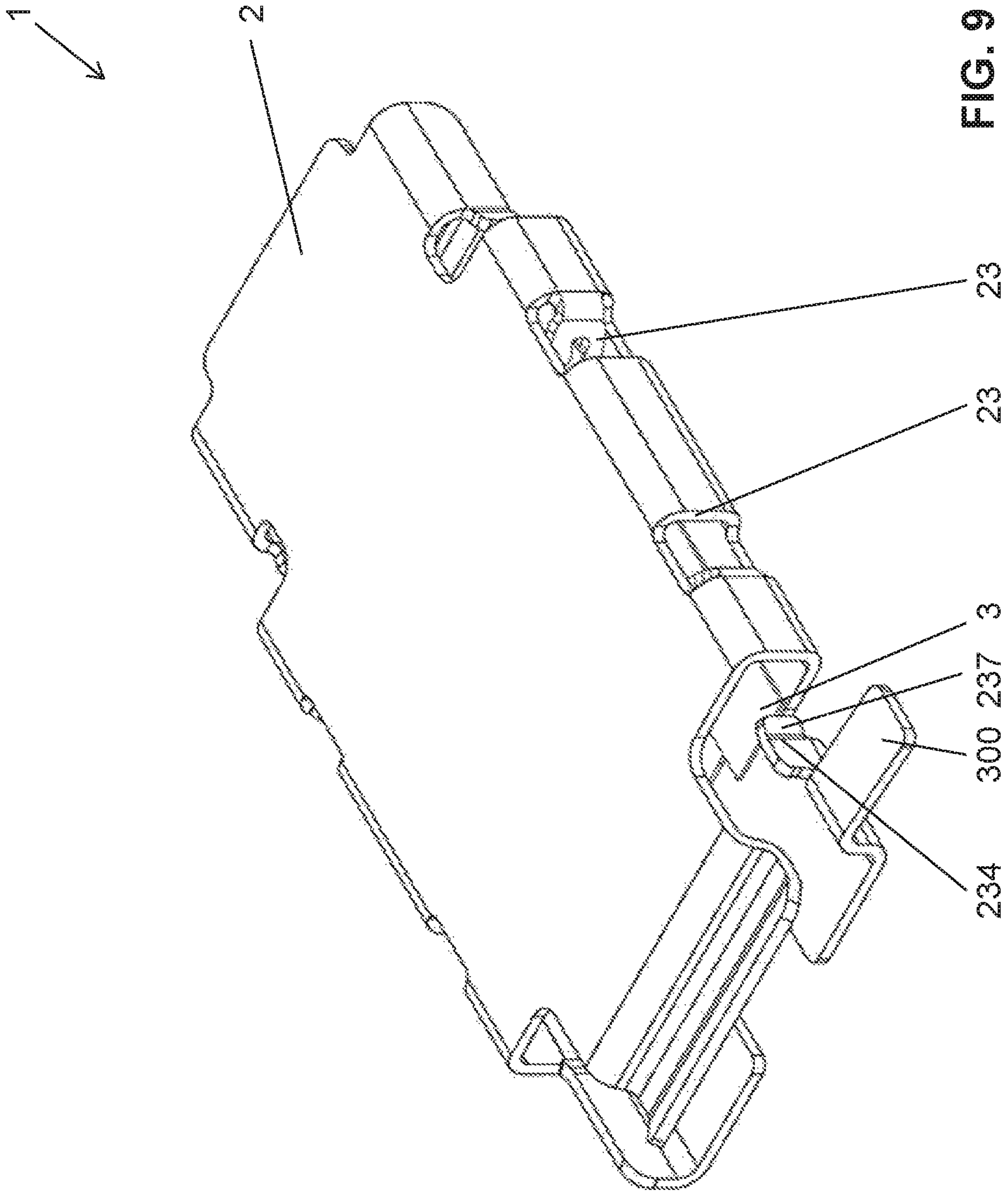
FIG. 9, a further perspective view of FIG. 8.

FIGS. 8 and 9 show a further embodiment of the present invention. The same parts are given the same reference numbers, and reference is made to the above description.

In addition, the further embodiment comprises a positioning tab 300 protruding from the housing 2. The positioning tab 300 serves as an element for positioning the housing 2 in a superordinate system, so that the housing 2 assumes the correct position.

Furthermore, the contact element 3 is inserted into the housing 2 by another method. In this way, the housing 2 and the contact element 3 have no installation openings. The contact element 3 is pulled into the interior 20 by means of a tool and then comes into contact with the already formed bearing points 23 in the interior 20. The contact element is pulled in the direction R3 or R3'.

Once the contact element 3 is situated in the interior 20, the end stops 234 and funnel tabs 237 formed on them are bent, so that the connection element 1 is likewise secured in the interior 20 against a movement in the direction R3 or R3'. The funnel tabs 237 are optional, that is, these may also be absent from the second embodiment.

LIST OF REFERENCE NUMBERS

1 connection element
2 housing
3 contact element
4 first busbar
5 second busbar
20 interior
21 first receiving space
22 second receiving space
23 bearing points
24 end stop element
27 boundary element
28 first entrance opening
29 second entrance opening
31 carrier strip
32 contact webs
33 upper edge
34 torsion spring joint
35 lower edge
39 plane
40 end face
41 side walls
42 contact surface
43 surface
50 end face
51 side walls
52 contact surface
53 surface
230 slot
231 free end
232 end face

233 installation openings
234 end stop
235 installation openings
236 bearing surface
237 funnel tabs
240 wall
241 side edge
242 side wall
280 inserting aids
290 inserting aids
281 side inserting aids
291 side inserting aids
300 positioning tab
L clear width of interior
L1 clear width of first receiving space
L2 clear width of second receiving space
E1 inserting direction
E2 inserting direction

The invention claimed is:

1. A connection element for establishing an electrical contact between two busbars, wherein the connection element comprises:

- a housing with an interior; and
- a contact element, which is mounted in the interior,
- wherein each of the two busbars can be inserted into the housing along an inserting direction,
- wherein the contact element divides the interior along a plane into at least one first receiving space to receive a first busbar and a second receiving space to receive a second busbar,
- wherein the contact element can establish an electrical contact between the first busbar and the second busbar,
- wherein the contact element is mounted by several bearing points in the interior of the housing, and
- wherein at least one of the bearing points protrudes from a side wall into the interior, the side wall lying in a transverse plane oriented transversely to the plane, and the bearing point for the contact element providing a movement limitation in at least one translatory direction,
- wherein one of the at least one of the bearing points is a single bearing point, which starting from a middle position of the contact element provides a movement limitation for the contact element in a translatory direction,
- wherein said single bearing point is provided by a bearing surface, and
- wherein the bearing surfaces lying closer to an entrance opening, as seen in the inserting direction, are situated at a greater distance from the wall coming into contact with the busbar than bearing surfaces lying further away from the entrance opening.

2. The connection element as claimed in claim 1, wherein said translatory direction runs substantially at right angles to the plane, and the contact element is mounted preferably floating in said bearing point.

3. The connection element as claimed in claim 1, wherein one of said bearing points is a double bearing point, which starting from a middle position of the contact element provides a movement limitation for the contact element in two oppositely running translatory directions.

4. The connection element as claimed in claim 3, wherein at least three, preferably four double bearing points are arranged, wherein two double bearing points protrude from a first side wall into the interior, and wherein one double bearing point or two double bearing points protrude from a side wall situated opposite the first side wall into the interior.

5. The connection element as claimed in claim 3, wherein the double bearing point has a slot to receive the contact element.

6. The connection element as claimed in claim 5, wherein the slot in one direction at right angles to said plane is configured broader than the thickness of the contact element, such that a play is provided between the slot and the contact element.

7. The connection element as claimed in claim 5, wherein the slots within one group of bearing points are offset from each other with respect to the plane.

8. The connection element as claimed in claim 5, wherein the slots lying closer to an entrance opening, as seen in the inserting direction, are situated at a greater distance from the wall coming into contact with the busbar than the slots lying further away from the entrance opening.

9. The connection element as claimed in claim 5, wherein the bearing points are webs bent out from the housing and protruding into the interior, the webs being inclined preferably at an angle relative to the longitudinal axis, the angle being between 10° and 170°, and wherein the slot is arranged at the free end of the web and extends into the web at an end face closing off the free end, the slot being open in the end face.

10. The connection element as claimed in claim 1, wherein from a first side wall at least two single bearing points protrude into the interior, wherein one of the two single bearing points limits the movement in one of the translatory directions and wherein the other of the two single bearing points limits the movement in the opposite translatory direction, and wherein from a side wall situated opposite the first side wall at least two single bearing points protrude into the interior, wherein one of the two single bearing points limits the movement in one of the translatory directions and wherein the other of the two single bearing points limits the movement in the opposite translatory direction.

11. The connection element as claimed in claim 1, wherein the bearing surface within one group of bearing points are offset from each other with respect to the plane.

12. The connection element as claimed in claim 1, wherein the bearing points are webs bent out from the housing and protruding into the interior, the webs being inclined preferably at an angle relative to the longitudinal axis, the angle being between 10° and 170°, and wherein a bearing surface is arranged at the free end of the web.

13. The connection element as claimed in claim 1, wherein two bearing points opposite each other with respect to the interior are present, wherein these two oppositely situated bearing points starting from a middle position of the contact element provide a movement limitation for the contact element in two oppositely running second translatory directions, the second translatory direction running substantially transversely to the inserting direction and parallel to the plane.

14. The connection element as claimed in claim 1, wherein the bearing points are webs bent out from the housing and protruding into the interior, the webs being inclined preferably at an angle relative to the longitudinal axis, the angle being between 10° and 170°.

15. The connection element as claimed in claim 14, wherein the slot is arranged at the free end of the web and extends into the web at an end face closing off the free end, the slot being open in the end face, and/or wherein a bearing surface is arranged at the free end of the web.

16. The connection element as claimed in claim 1, wherein the contact element is mounted floating in the interior in two third translatory directions running opposite to each other, extending parallel to the inserting direction, so that the contact element can move in this third translatory direction within certain limits, limits being provided by an end stop.

17. The connection element as claimed in claim 1, wherein the housing is provided by a wall, two side walls formed at opposite edges from the wall and protruding substantially perpendicular from the wall, and by side edges formed on the side walls.

18. The connection element as claimed in claim 1, wherein the housing has one or more installation openings, which are preferably arranged such that access to the contact element for a tool can be provided and/or wherein the contact element has one or more installation openings in which a tool can engage.

19. The connection element as claimed in claim 1, wherein the housing has guide elements in the area of the entrance openings, making it easier to insert the busbar and/or wherein the end stop is part of the guide element.

20. A connection element for establishing an electrical contact between two busbars, wherein the connection element comprises:

a housing with an interior; and a contact element, which is mounted in the interior, wherein each of the two busbars can be inserted into the housing along an inserting direction, wherein the contact element divides the interior along a plane into at least one first receiving space to receive a first busbar and a second receiving space to receive a second busbar, wherein the contact element can establish an electrical contact between the first busbar and the second busbar, wherein the contact element is mounted by several bearing points in the interior of the housing, wherein at least one of the bearing points protrudes from a side wall into the interior, the side wall lying in a transverse plane oriented transversely to the plane, and the bearing point for the contact element providing a movement limitation in at least one translatory direction;

wherein one of said bearing points is a double bearing point, which starting from a middle position of the contact element provides a movement limitation for the contact element in two oppositely running translatory directions;

wherein one of the mentioned bearing points is a single bearing point, which starting from a middle position of the contact element provides a movement limitation for the contact element in one translatory direction;

wherein the double bearing point has a slot to receive the contact element; and wherein the slot in one direction at right angles to said plane is configured broader than the thickness of the contact element, such that a play is provided between the slot and the contact element.

21. The connection element as claimed in claim 20, wherein from a first side wall at least one double bearing point protrudes into the interior and wherein from a side wall situated opposite the first side wall at least two single bearing points protrude into the interior, wherein one of the two single bearing points limits the movement in one of the translatory directions and wherein the other of the two single bearing points limits the movement in the opposite translatory direction.

22. The connection element as claimed in claim 20, wherein the slot lying closer to an entrance opening, as seen in the inserting direction, are situated at a greater distance from the wall coming into contact with the busbar than the slots lying further away from the entrance opening.

23. The connection element as claimed in claim 20, wherein the bearing points are webs bent out from the housing and protruding into the interior, the webs being inclined preferably at an angle relative to the longitudinal axis, the angle being between 10° and 170°, and wherein the slot is arranged at the free end of the web and extends into the web at an end face closing off the free end, the slot being open in the end face.

24. The connection element as claimed in claim 20, wherein the single bearing point is provided by a bearing surface.

25. The connection element as claimed in claim 24, wherein bearing surfaces lying closer to an entrance opening, as seen in the inserting direction, are situated at a greater distance from the wall coming into contact with the busbar than the bearing surfaces lying further away from the entrance opening.

26. The connection element as claimed in claim 24, wherein the bearing points are webs bent out from the housing and protruding into the interior, the webs being inclined preferably at an angle relative to the longitudinal axis, the angle being between 10° and 170°, and wherein a bearing surface is arranged at the free end of the web.

27. The connection element as claimed in claim 20, wherein the double bearing point has a slot to receive the contact element, and wherein the single bearing point is provided by a bearing surface.

28. The connection element as claimed in claim 27, wherein the slot in one direction at right angles to said plane is configured broader than the thickness of the contact element, such that a play is provided between the slot and the contact element.

29. The connection element as claimed in claim 27, wherein the slots or bearing surfaces lying closer to an entrance opening, as seen in the inserting direction, are situated at a greater distance from the wall coming into contact with the busbar than the slots or bearing surfaces lying further away from the entrance opening.

30. The connection element as claimed in claim 20, wherein the bearing points are webs bent out from the housing and protruding into the interior, the webs being inclined preferably at an angle relative to the longitudinal axis, the angle being between 10° and 170°, and wherein the slot is arranged at the free end of the web and extends into the web at an end face closing off the free end, the slot being open in the end face, and/or wherein a bearing surface is arranged at the free end of the web.

31. A connection element for establishing an electrical contact between two busbars, wherein the connection element comprises:

a housing with an interior; and a contact element, which is mounted in the interior, wherein each of the two busbars can be inserted into the housing along an inserting direction, wherein the contact element divides the interior along a plane into at least one first receiving space to receive a first busbar and a second receiving space to receive a second busbar, wherein the contact element can establish an electrical contact between the first busbar and the second busbar, wherein the contact element is mounted by several bearing points in the interior of the housing, wherein at least one of the bearing points protrudes from a side wall into the interior, the side wall lying in a transverse plane oriented transversely to the plane, and the bearing point for the contact element providing a movement limitation in at least one translatory direction, wherein one of said bearing points is a double bearing point, which starting from a middle position of the contact element provides a movement limitation for the contact element in two oppositely running translatory directions, wherein the double bearing point has a slot to receive the contact element and wherein the slot in one direction at right angles to said plane is configured broader than the thickness of the contact element, such that a play is provided between the slot and the contact element.

32. The connection element as claimed in claim 31, wherein said translatory direction runs substantially at right angles to the plane, and the contact element is mounted preferably floating in said bearing point.

33. The connection element as claimed in claim 3, wherein at least three, preferably four double bearing points are arranged, wherein two double bearing points protrude from a first side wall into the interior, and wherein one double bearing point or two double bearing points protrude from a side wall situated opposite the first side wall into the interior.

34. The connection element as claimed in claim 31, wherein the slots within one group of bearing points are offset from each other with respect to the plane.

35. The connection element as claimed in claim 31, wherein the slots lying closer to an entrance opening, as seen in the inserting direction, are situated at a greater distance from the wall coming into contact with the busbar than the slots lying further away from the entrance opening.

36. The connection element as claimed in claim 31, wherein the bearing points are webs bent out from the housing and protruding into the interior, the webs being inclined preferably at an angle relative to the longitudinal axis, the angle being between 10° and 170°, and wherein the slot is arranged at the free end of the web and extends into the web at an end face closing off the free end, the slot being open in the end face.

37. The connection element as claimed in claim 31, wherein one of the mentioned bearing points is a single bearing point, which starting from a middle position of the contact element provides a movement limitation for the contact element in one translatory direction.

38. The connection element as claimed in claim 37, wherein from a first side wall at least two single bearing points protrude into the interior, wherein one of the two single bearing points limits the movement in one of the translatory directions and wherein the other of the two single bearing points limits the movement in the opposite translatory direction, and wherein from a side wall situated opposite the first side wall at least two single bearing points protrude into the interior, wherein one of the two single bearing points limits the movement in one of the translatory directions and wherein the other of the two single bearing points limits the movement in the opposite translatory direction.

39. The connection element as claimed in claim 37, wherein the single bearing point is provided by a bearing surface.

40. The connection element as claimed in claim 39, wherein the bearing surface within one group of bearing points are offset from each other with respect to the plane.

41. The connection element as claimed in claim 39, wherein the bearing surfaces lying closer to an entrance opening, as seen in the inserting direction, are situated at a greater distance from the wall coming into contact with the busbar than bearing surfaces lying further away from the entrance opening.

42. The connection element as claimed in claim 38, wherein the bearing points are webs bent out from the housing and protruding into the interior, the webs being inclined preferably at an angle relative to the longitudinal axis, the angle being between 10° and 170°, and wherein a bearing surface is arranged at the free end of the web.

43. The connection element as claimed in claim 31, wherein two bearing points opposite each other with respect to the interior are present, wherein these two oppositely situated bearing points starting from a middle position of the contact element provide a movement limitation for the contact element in two oppositely running second translatory directions, the second translatory direction running substantially transversely to the inserting direction and parallel to the plane.

44. The connection element as claimed in claim 31, wherein the bearing points are webs bent out from the housing and protruding into the interior, the webs being inclined preferably at an angle relative to the longitudinal axis, the angle being between 10° and 170°.

45. The connection element as claimed in claim 31, wherein the slot is arranged at the free end of the web and extends into the web at an end face closing off the free end, the slot being open in the end face, and/or wherein a bearing surface is arranged at the free end of the web.

46. The connection element as claimed in claim 31, wherein the contact element is mounted floating in the interior in two third translatory directions running opposite to each other, extending parallel to the inserting direction, so that the contact element can move in this third translatory direction within certain limits, limits being provided by an end stop.

47. The connection element as claimed in claim 31, wherein the housing is provided by a wall, two side walls formed at opposite edges from the wall and protruding substantially perpendicular from the wall, and by side edges formed on the side walls.

48. The connection element as claimed in claim 31, wherein the housing has one or more installation openings, which are preferably arranged such that access to the contact element for a tool can be provided and/or wherein the contact element has one or more installation openings in which a tool can engage.

49. The connection element as claimed in claim 31, wherein the housing has guide elements in the area of the entrance openings, making it easier to insert the busbar and/or wherein the end stop is part of the guide element.

* * * * *